(12) United States Patent
Thero et al.

(10) Patent No.: US 8,806,013 B2
(45) Date of Patent: Aug. 12, 2014

(54) METHODS AND SYSTEMS FOR SHARING A PRINTER

(75) Inventors: Daniel Thero, Fort Collins, CO (US); Matthew D. Haines, Fort Collins, CO (US); William G. McCollom, Fort Collins, CO (US); Philip M. Walker, Fort Collins, CO (US); Gregory J. Lipinski, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1753 days.

(21) Appl. No.: 11/742,518

(22) Filed: Apr. 30, 2007

(65) Prior Publication Data

US 2008/0270525 A1  Oct. 30, 2008

(51) Int. Cl.
*G06F 15/16* (2006.01)
*G06F 15/173* (2006.01)

(52) U.S. Cl.
USPC .......................................... 709/226; 709/203

(58) Field of Classification Search
USPC ................. 709/201–203, 223–226, 238–244; 710/1–74
See application file for complete search history.

(56) References Cited

U.S. PATENT DOCUMENTS

| | | | |
|---|---|---|---|
| 7,190,477 B2 * | 3/2007 | Ferlitsch | 358/1.15 |
| 2002/0114004 A1 | 8/2002 | Ferlitsch | |
| 2002/0142720 A1 | 10/2002 | Russell et al. | |
| 2002/0181008 A1 | 12/2002 | Nozaki | |
| 2005/0038925 A1 | 2/2005 | DeVorchik et al. | |
| 2005/0134904 A1 | 6/2005 | Voskuil | |
| 2006/0238806 A1 | 10/2006 | Karaoguz et al. | |

FOREIGN PATENT DOCUMENTS

WO      2006028236      3/2006

OTHER PUBLICATIONS

Barb L, et al.., "Sharing Printer-Windows 98 and XP," available Sep. 23, 2005, <http://www.windowsbbs.com/legacy-windows/48107-sharing-printer-windows-98-xp.html>.
Drew University, "Installing a Network Printer," available Sep. 10, 2006, <http://web.archive.org/web/20060910021124/http://depts.drew.edu/its/docs/network/printer/index.php>.
English translation of Office Action issued in relation to German patent application No. 11 2008 001 168, dated Feb. 15, 2010.
FabulaTech, Inc., "USB over Network—USB over IP—Shared USB," Jan. 2, 2007, <http://web.archive.org/web/20070101215545/http://www.fabulatech.com/usb-over-network.htlml>.
Hirofuchi et al., "USB/IP: A Transparent Device Sharing Technology over IP Network," Information and Media Technologies, 1 (1): pp. 639-651; 2006.
Information Technology Services, Univ of Hawaii, "File Sharing and Printer Sharing for Windows 95/98," available Dec. 6, 2006, <http://web.archive.org/web/20061205044216/http://hawaii.edu/its/micro/pc/fps9x.html>.
International Preliminary Report on Patentability received for PCT Application No. PCT/US2008/061787, Nov. 12, 2009, 6 pages.
International Search Report and Written Opinion received for PCT Application No. PCT/US2008/061787, Sep. 26, 2008, 10 pages.

(Continued)

*Primary Examiner* — Afshawn Towfighi (57) ABSTRACT

A system is provided, the system having at least one client computer and a server computer coupled to the at least one client computer via a network. The system also has a printer coupled to the server computer and shared by the at least one client computer. The printer is perceived by each client computer to be a local printer.

18 Claims, 4 Drawing Sheets

(56) References Cited

OTHER PUBLICATIONS

MapleSoft Enterprises, "Solutions to Print Problems," Apr. 6, 2006, <http://web.archive.org/web/20060406211128/http://www.maplesoft.net/printissues.htm>.

MattG, et al., "Sharing Windows 98 Printer . . . ," available Sep. 9, 2005, <http://www.techspot.com/community/topics/sharing-windows-98-printer 9090/>.

Microsoft Corp, "How to Set Up a Small Network with Windows XP Home Edition (PART 8)," available Jun. 7, 2005, <http://web.archive.org/web/2005060781146/http://support.microsoft.com/default.aspx?scid=kb;en-us; 814005?Product=winxp>.

Office Action issued in relation to Great Brittan patent application No. GB0919001, dated Aug. 10, 2011.

Office Action issued in relation to Great Brittan patent application No. GB0919001, dated May 10, 2011.

USB Center, "USB Auto Switch für [for] 4 Computer," available Feb. 11, 2007, <http://web.archive.org/web/20070211153247/http://www.usb-center.de/USB_Auto-Switch_ABCD_Goodway_UH-842_und_parallel_USB-0388.html>.

\* cited by examiner

METHODS AND SYSTEMS FOR SHARING A PRINTER

BACKGROUND

Electronic printers enable text and graphics to be printed on paper or another medium. The text and graphics can be part of a document or other file. As computer networks have proliferated, hardware and software has been developed to permit multiple computers to share at least one printer. For example, multiple clients and a printer can be attached to a network server having a printer driver. The printer driver handles print requests from the multiple clients.

Unfortunately, variance in the operating systems (OSs) being run on clients and in the hardware/software of different printers creates ongoing compatibility issues. Thus, setting up a server for use with a particular printer and/or clients, does not necessarily apply to other printers or clients. Also, many servers are intentionally "headless" (without a dedicated human interface such as a monitor, a keyboard or a mouse) such that modification of server functionality is difficult for inexperienced users.

BRIEF DESCRIPTION OF THE DRAWINGS

For a detailed description of exemplary embodiments of the invention, reference will now be made to the accompanying drawings in which.

NOTATION AND NOMENCLATURE

Certain terms are used throughout the following description and claims to refer to particular system components. As one skilled in the art will appreciate, computer companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" or "couples" is intended to mean either an indirect, direct, optical or wireless electrical connection. Thus, if a first device couples to a second device, that connection may be through a direct electrical connection, through an indirect electrical connection via other devices and connections, through an optical electrical connection, or through a wireless electrical connection.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

As disclosed herein, embodiments enable multiple clients to share a printer through a network. In other words, the printer couples to a server that is accessible to multiple clients. In at least some embodiments, a "printer tunnel" is provided between the clients and the printer. As used herein, a printer tunnel is a combination of hardware, firmware and/or software that causes the server to become at least partially transparent with regard to printing. In this condition, each client operates as if the printer is connected locally. The printer tunnel preferably handles conflicts between print requests from different clients and is compatible with varying client operating systems, client printer drivers and printers.

Figure 1:
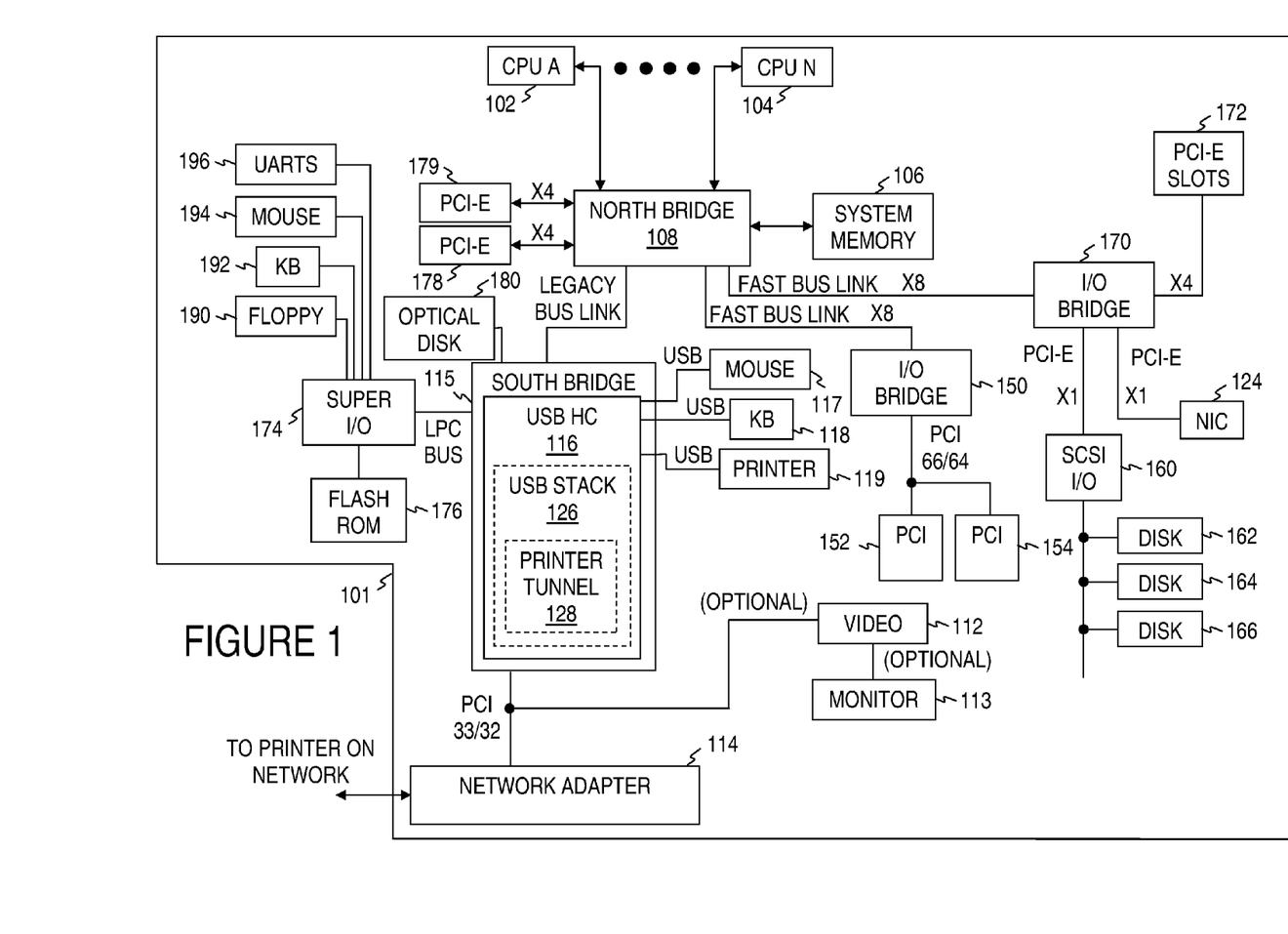
FIG. 1 illustrates a computer in accordance with embodiments.

Referring now to the drawings and in particular to FIG. 1, there is shown a computer 101 in accordance with embodiments of the disclosure. The computer 101 corresponds to a client computer or a server computer. In at least some embodiments, the server computer is a headless server (i.e., without a dedicated human interface such as a monitor, a keyboard or a mouse). As shown, the computer 101 comprises a plurality of central processing units (CPUs) 102, 104 coupled to a bus bridge, commonly referred to in the computer industry as a "North Bridge" 108. The North Bridge 108 couples the CPUs 102, 104 to system memory 106 and to other components of the computer 101. The North Bridge 108 has a significant impact on the computer's performance given that it defines the speed at which data flows between the CPUs 102, 104 and the system memory 106.

As shown, the North Bridge 108 couples to an input/output (I/O) bridge 150 via a "fast" serial bus link (compared to a legacy bus link) having, in some embodiments, eight serial communication channels (×8). This bus may be a proprietary chipset interconnect or may be consistent with an established industry standard such as PCI-Express. In at least some embodiments, the I/O bridge 150 couples to PCI slots 152, 154 via a PCI 66/64 communication interface. The PCI slots 152, 154 may be configured to support insertable/removable PCI cards that enhance the functionality of the computer 101.

The North Bridge 108 also couples to an I/O bridge 170 via another "fast" bus link (compared to a legacy bus link) having, in some embodiments, eight communication channels (×8). As shown, the I/O bridge 170 couples to a Small Computer System Interface (SCSI) module 160 via a PCI Express (PCI-E) communication bus. The SCSI module 160 supports several storage disks 162, 164, 166 based on a SCSI communication protocol. The I/O bridge 170 also couples to a Network Interface Card (NIC) 124 via a PCI-E communication bus. The NIC 124 enables the computer 101 to communicate with other computers or network devices based on a network communication protocol such as Ethernet with Transmission Control Protocol/Internet Protocol (TCP/IP). The I/O bridge 170 also couples to PCI-E slots 172 (e.g., via a communication bus having, in some embodiments, four communication channels (×4)). The PCI-E slots are configured to support insertable/removable PCI-E cards that enhance the functionality of the computer 101. Those skilled in the art will appreciate that the width of the fast bus links as well as PCI-E connections for slots and devices are chosen based on the anticipated bandwidth of the connected devices. Other interconnects as well as other lane widths may be chosen by the system designer.

As shown, the North Bridge 108 also couples to a South Bridge 115 via a legacy communication bus link. This bus link may be a proprietary chipset interconnect or may be consistent with an established industry standard such as PCI-Express. In at least some embodiments, the South Bridge 115 comprises a USB host controller 116 that couples to and supports USB peripheral devices such as a USB mouse 117, a USB keyboard (KB) 118 and a USB printer 119. Those skilled in the art will appreciate that these devices may be coupled through USB connectors and are optional. The South Bridge 115 also couples to and supports an optical disk drive 180 (e.g., a CD-ROM or DVD-ROM drive). The South Bridge 115 also couples to a Super input/output (I/O) interface 174 via a low-pin-count (LPC) bus. The Super I/O (SIO) 174 couples to and supports a Flash ROM 176 as well as a floppy drive 190, a legacy keyboard (KB) 192, a legacy mouse 194 and Universal Asynchronous Receiver/Transmitters (UARTs) 196. Like the USB devices mention above, the SIO 174 provides interfaces to which the enumerated legacy devices may be attached. The presence of a physical legacy keyboard or mouse may not be required for proper operation of the computer 101.

As shown, the South Bridge 115 optionally couples to and supports a video card 112 which optionally couples to a monitor 113. For example, if the computer 101 corresponds to a client, the video card 112 and monitor 113 could be included. If the computer 101 corresponds to a server, the video card 112 and monitor 113 could be excluded.

The South Bridge 115 also couples to and supports a network adapter 114 via a PCI 33/32 communication bus. Alternatively, the network adapter 114 may be coupled to the host via another suitable communication interface such as PCI-Express, PCI-X, 66/64, LPC, or the like. The network adapter 114 enables the computer 101 to communicate with a printer on a network.

As shown in FIG. 1, the USB host controller 116 of the South Bridge 115 stores a USB stack 126 having a printer tunnel 128. The USB stack 126 and/or the printer tunnel 128 are alternatively stored in another location of the computer 101. The USB stack 126 can be split into different layers. In some embodiments, a lower USB stack layer contains the host controller driver, providing a generic interface to the USB host controller hardware and its scheduling facilities. The lower USB stack layer supports functions such as initialization of the USB host controller hardware, scheduling of transfers and handling of completed and/or failed transfers. Each host controller driver implements a virtual hub providing hardware independent access to the registers controlling the USB ports of the computer 101.

A middle USB stack layer handles function such as USB device connection and disconnection, basic initialization of USB devices, driver selection, USB communication channels and resource management. This middle USB stack layer also controls the default channels and USB device requests transferred via the default channels.

An upper USB stack layer contains individual drivers supporting specific devices or classes of devices. The upper USB stack layer supports protocols used for non-default communication channels. The upper USB stack layer also adds functionality to make USB devices available to the operating system (OS) or other components of the computer 101. In some embodiments, the upper USB stack layer relies on a USB driver interface (USBDI) exposed by the middle USB stack layer. In at least some embodiments, the printer tunnel 128 is part of the lower USB stack layer.

For convenience in describing embodiments, the printer tunnel 128 is sometimes described herein as having a client end and a server end. Also, the printer tunnel 128 is sometimes described herein as having a printer tunnel manager. In at least some embodiments, the printer tunnel manager handles conflicts between overlapping print requests. The printer tunnel manager also forwards printer status notifications or printer exceptions to at least one of the clients. In some embodiments, the printer tunnel manager operates on the server's end of the printer tunnel 128. In alternative embodiments, the printer tunnel manager operates on the client's end of the printer tunnel 128 or a combination of the client's end and the server's end of the printer tunnel 128. Regardless of the location of the printer tunnel manager, the operations of the printer tunnel manager can be supported by the client end or the server end of the printer tunnel 128.

If the computer 101 corresponds to a client, the client's end of the printer tunnel 128 is responsible for several functions including selective emulation of a USB printer. In other words, such emulation should cause each client to be able to receive and recognize data received from a printer on a network as if received from a locally-connected USB printer. The USB drivers implemented by the computer 101 to interpret data from an emulated USB printer are compatible with existing USB protocols (i.e., designing and installing new printer drivers to send data to and receive data from the remote printer is unnecessary).

In at least some embodiments, the client end or the server end of the printer tunnel 128 interfaces with a communication bus other than the serial communication links described in the USB protocol specifications (e.g., the communication bus may be based on a Peripheral Component Interconnect (PCI) protocol or some other protocol). In such case, the client end or server end of the printer tunnel 128 is able to convert data from one protocol to the other and vice versa.

In at least some embodiments, the client's end of the printer tunnel 128 supplies the host operating system (OS) with hot-plug events via Universal Host Controller Interface (UHCI) registers such as port status and control registers "PORTSC1" and "PORTSC2." In a real UHCI controller, the PORTSC1 and PORTSC2 registers represent physical, wired links to USB devices. However, in at least some embodiments presented herein, these registers represent connections to virtual devices (there is no actual wiring or bus connections involved). The client's end of the printer tunnel 128 can determine which device the computer 101 is trying to communicate with by examining the address in the transfer descriptor (TD) token field and the connect and enable status of the PORTSC registers.

In at least some embodiments, the client's end of the printer tunnel 128 associates a virtual printer with a USB port (e.g., PORTSC1). To notify the computer 101 to recognize the virtual printer, a Connect bit (bit0) and possibly a change-in-connect bit (bit1) is asserted for the corresponding port. In response to the asserted connect bits, the computer 101 detects the virtual printer and attempts to enumerate (i.e., assign an address) and configure the virtual printer.

Initially (before the virtual printer has been given an address by the host computer's USB driver), the virtual printer may have the address "zero." In this state, communication with the virtual printer based on address alone is problematic if another USB device has this same address. To overcome any addressing conflicts, the client's end of the printer tunnel 128 may choose which device to communicate with by enabling or disabling each PORTSC register (bit2 of the PORTSC registers). Thus, in some embodiments, the client's end of the printer tunnel 128 is able to determine the values of the bits in the PORTSC registers and transfer data to the appropriate device or virtual device. Once a virtual printer has been enumerated (e.g., given a USB address other than zero), the port for that virtual printer can be enabled permanently or temporarily (e.g., until the next reset event) and the client's end of the printer tunnel 128 is able to find the virtual printer using its associated address.

When a client computer generates a print request, the request is forwarded from a local printer driver to the USB stack 126. The client's end of the printer tunnel 128 then sends the print request to the assigned address of the virtual printer. The print request is actually sent to the server's end of the printer tunnel 128 and then to a printer coupled to the server. In some embodiments, the client end and the server end of the printer tunnel 128 is able to encapsulate/decapsulate data (e.g., to and from a network protocol) such as print requests, printer status responses, printer exceptions or other data. As an example, printer data sent to or received from a network can be repackaged for transferring tunneled messages/packets between a USB protocol and network protocol (e.g., Ethernet with TCP/IP). In some cases, the client's end of the printer tunnel 128 encapsulates print requests and the server's end of the printer tunnel 128 decapsulates the print requests. The print requests are then forwarded to a printer coupled locally to the server. Also, in some cases, the server's end of the printer tunnel 128 encapsulates printer status responses or printer exceptions and the client's end of the printer tunnel 128 de-capsulates the printer status responses or printer exceptions. The printer states responses or printer exceptions are then processed by the receiving client's local printer driver.

In at least some embodiments, the printer tunnel manager handles multiple print requests. Overlapping print requests could be handled on a first-come first-serve basis or some other handling scheme. As an example, in some embodiments, the printer tunnel manager buffers overlapping print requests and process the print requests sequentially. Alternatively, a client that has control of the printer is able to continue sending print requests for a threshold amount of time before control of the printer is transferred to a waiting client. In either case, control of the printer can be transferred from a controlling client to another client waiting to proceed with a pending print request. While a client waits for a currently pending print request to complete, the printer tunnel manager simulate standard printer delays (e.g., a printer warm-up delay) to prevent a waiting client from determining that a printer failure has occurred. This capability may be useful in embodiments where a client's printer driver is compatible with standard delay messages from a local printer, but not with sharing a printer.

In at least some embodiments, the printer tunnel manager and the respective ends of the printer tunnel 128 are able to manage client perception of the printing experience by adjusting printer driver timeout settings, simulating standard printer delays, and presenting status messages appropriate for the remaining delay. If a given client printer driver does not support sharing a printer, the respective ends of the printer tunnel 128 and the printer tunnel manager create the illusion that the given client has exclusive control of the printer (at least when printing).

Embodiments of clients and servers are not limited to the computer 101 of FIG. 1. FIG. 1 simply illustrates one embodiment. Alternative embodiments vary with respect to processing, memory, interconnects, protocols, peripherals and other functional aspects. In general, client computers should be able to execute a standard printer driver for use with a local printer (e.g., a USB printer). Client computers also support operation of a printer tunnel that enables a remote printer (i.e., a printer attached to the server) to appear to the client computer and to the client's printer driver as a local printer.

In general, server computers should provide an interface between clients having local printer drivers and a compatible printer. In at least some embodiments, a server computer connects to multiple clients via an appropriate port (e.g., an Ethernet port and/or hub). The server computer also attaches to a printer via an appropriate port (e.g., a USB port). In some embodiments, the server computer does not provide a centralized printer driver since each client is executing a local printer driver. Instead, the server computer supports operation of a printer tunnel and a printer tunnel manager to disguise a shared printer attached to the server to be a local printer for each client. The printer tunnel manager handles overlapping print requests by simulating standard print delays (recognized by the client printer drivers) and selectively transferring control of the printer from one client to another to enable clients to take turns processing pending print requests. Together the client's end of the printer tunnel, the server's end of the printer tunnel, and the printer tunnel manager could be considered to be a single entity that accomplishes the task of permitting multiple clients to share a printer attached to the server as if the printer were local to each client. The different functions described herein for the printer tunnel involve the clients and the server in varying amounts.

As previously mentioned, centralized printer drivers (e.g., on the server) can be problematic since updates to the hardware, firmware and/or software of client computers and printers may occur and modifying a network printer driver on a headless server is difficult for inexperienced users. In contrast, the printer tunnel and printer tunnel manager provide selected functions (e.g., disguising a printer attached to a server as a local printer for each client and handling overlapping print requests from multiple clients) that are unlikely to change even if updates to clients or printers occur. In some cases, updates (e.g., the printer is changed) may only involve minor changes implemented at the server side (e.g., the server is configured to recognize a new printer) without affecting the clients. Although the printer tunnel can be used in a business environment and even over large distances, the printer tunnel is especially beneficial in a home environment where users are often inexperienced. In other words, some embodiments of the printer tunnel and printer tunnel manager are included as part of a server directed to the home environment.

Figure 2:
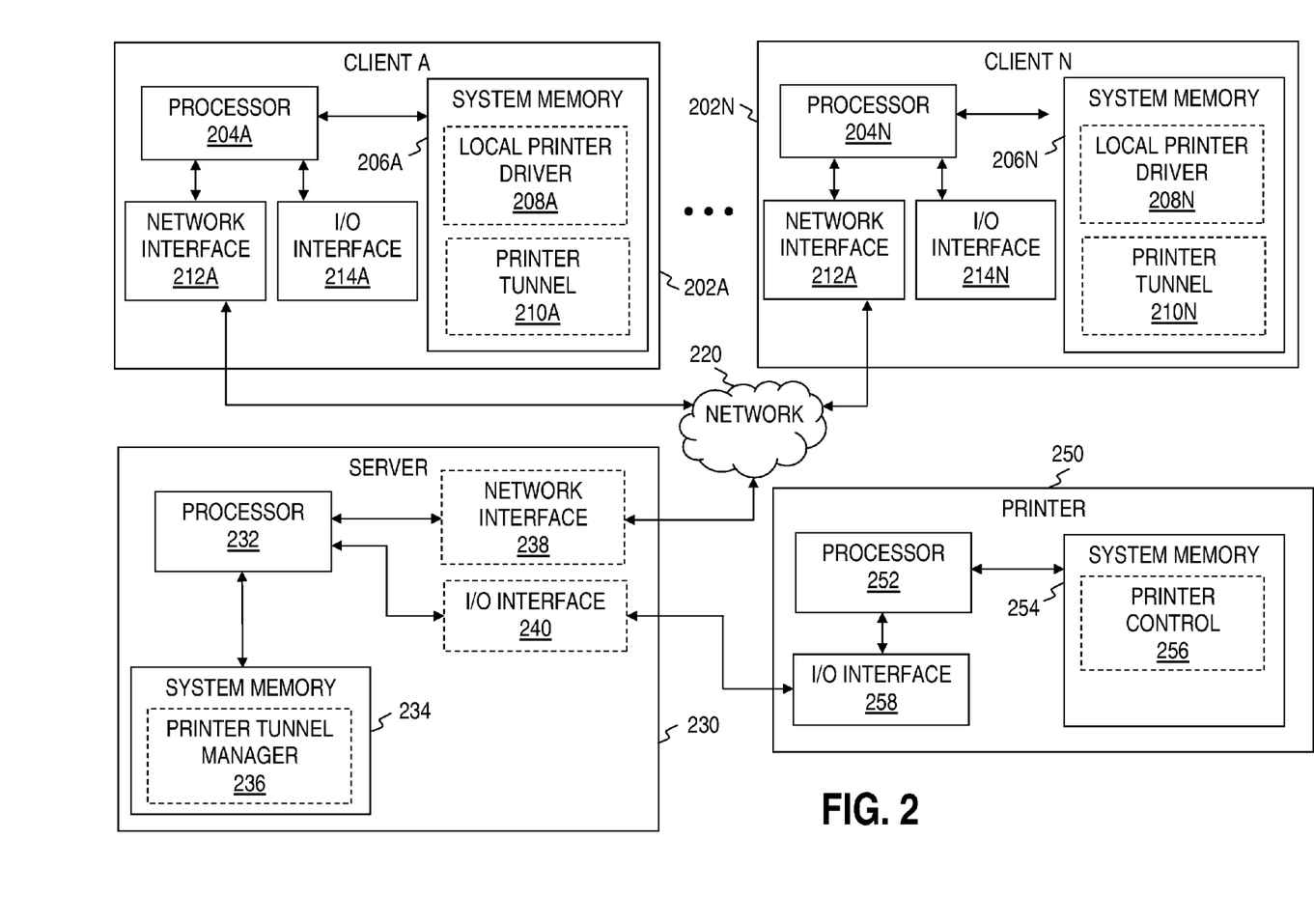
FIG. 2 illustrates a system in accordance with embodiments.

FIG. 2 shows a system 200 in accordance with embodiments. As shown, the system 200 comprises a plurality of clients 202A-202N that couple to a printer 250 via a network 220 and a server 230. The components of the plurality of clients 202A-202N, the network 220, the server 230 and the printer 250 have been simplified to facilitate describing embodiments. In various embodiments, the clients 202A-202N and the server 230 have more or less of the components described for the computer 101 of FIG. 1.

In FIG. 2, the printer 250 comprises a processor 252 coupled to a system memory 254 having printer control instructions 256. In at least some embodiments, the printer control instructions 256 enables the printer 250 to print documents and images received from the server 230. As needed, the printer control instructions 256 also enable to processor 252 to detect service needs, malfunctions, or exception conditions of the printer 250 and to subsequently issue printer service requests and notifications (e.g., out-of-paper, low toner or other notifications). The processor 252 also couples to an I/O interface 258 that enables the printer 250 to communicate with other devices such as the server 230 and the clients 202A-202N.

A representative description of each client will be provided by describing the client 202A. As shown in FIG. 2, the client 202A comprises a processor 204A coupled to a system memory 206A. The processor 204A also couples to a network interface 212A and an input/output interface 214A.

In at least some embodiments, the system memory 206A is a computer-readable medium that stores a local printer driver 208A and a printer tunnel 210A, which are executable by the processor 204A. The system memory 206A corresponds to at least one of secondary storage, read only memory (ROM), random access memory (RAM), or another storage medium now known or later developed. As an example, secondary storage comprises one or more disk drives or tape drives and is used for non-volatile storage of data and as an over-flow data storage device if RAM is not large enough to hold all working data. Secondary storage may be used to store programs that are loaded into RAM when such programs are selected for execution. ROM is used to store instructions and perhaps data that are read during program execution. ROM is a non-volatile memory device that typically has a small memory capacity relative to the larger memory capacity of secondary storage. RAM is used to store volatile data and perhaps to store instructions. Access to both ROM and RAM is typically faster than to secondary storage.

The local printer driver 208A supports printing to a local printer and is compatible with a specific printer or a specific class of printers. In at least some embodiments, the local printer driver 208A can detect when a printer is plugged into the I/O interface 214A (i.e., plug-and-play operations). The local printer driver 208A also supports various functions such as providing a user/printer interface, spooling print jobs, displaying messages to a user (e.g., printing initiated, printing delayed, printing canceled, time remaining for a print job, out-of-paper messages, low toner messages), conveying print quality selections by a user to the printer or other functions. Although the client 202A is able to interact with (e.g., print to and receive messages from) a local printer coupled to the I/O interface 214A based on the local printer driver 208A, the printer tunnel 210A enables the client 202A to interact with a remote printer (or at least a printer that attaches to a server rather than the client 202A).

In at least some embodiments, the printer tunnel 210A supports emulation of a virtual printer. In other words, the printer tunnel 210A causes the local printer driver 208A to interact with a remote printer as if the remote printer were a local printer coupled to the I/O interface 214A. The printer tunnel 210A can accomplish the emulation by setting up a virtual local printer address and appropriately channeling or emulating communications between the local printer driver 208A and the remote printer. When a remote printer is being used, the communications are channeled to and from the network interface 212A rather than the I/O interface 214A. As mentioned for the embodiment of FIG. 1, some embodiments of the printer tunnel 210A correspond to part of a USB stack although other embodiments now known or later developed are possible.

As shown in FIG. 2, the server 230 comprises a processor 232 coupled to a system memory 234. The processor 232 also couples to a network interface 238 and an I/O interface 240. The network interface 238 enables the server 230 to communicate with the network 220 and corresponds, for example, to an Ethernet interface. The I/O interface 240 enables the server 230 to communicate with a peripheral device such as the printer 250 and corresponds, for example, to a USB interface. In at least some embodiments, the I/O interfaces 214A-214N are the same as the I/O interface 240. In other words, the printer 250 can selectively couple directly to the server 230 or to one of the clients 202A-202N. When the printer 250 is coupled directly to the server 230, the clients are able to share the printer 250 through the server 230, even if the local printer drivers 208A-208N only support a local printer and not a shared printer.

In at least some embodiments, the system memory 234 of the server 230 is a computer-readable medium that stores a printer tunnel manager 236, which is executable by the processor 202A. The system memory 234 corresponds to at least one of secondary storage, ROM, RAM, or another storage medium now known or later developed. When executed, the printer tunnel manager 236 channels print requests from the clients 202A-202N to the printer 250. The print request handling scheme of the printer tunnel manager 236 operates on a first-come first-serve basis or some other scheme. Regardless of the print request handling scheme, the printer tunnel manager 236 selectively assigns control of the printer 250 to each respective client 202A-202N in a way that enables the clients 202A-202N to carry out print requests using the local printer drivers 208A-208N.

In at least some embodiments, a printer tunnel manager 236 handles a non-overlapping print request by assigning control of the printer 250 to the client that sent the print request. Once the non-overlapping printer request is complete, the printer 250 is not assigned to any of the clients or is assigned to a default client. If an overlapping print request is received, the printer tunnel manager 236 buffers the overlapping print request until a print request currently being processed is complete. Control of the printer 250 can be transferred from one client to another to enable each client to complete a print request. While the printer tunnel manager 236 is buffering a print request, a standard print delay is simulated by the printer tunnel manager 236 and sent to the local printer driver whose print request is being buffered. In other words, the local printer driver will recognize a standard print delay (e.g., a warm-up delay), but will not recognize a printer sharing delay. If a local printer driver is able to recognize a printer sharing delay, then the printer sharing delay is usable as one of the standard delays that the printer tunnel manager 236 uses to cause the local printer driver to wait its turn to receive control of the printer 250 and then complete a print request. The printer tunnel manager 236 preferably minimizes wait time for pending print requests and prevents local printer drivers from determining that the printer 250 is not available or has otherwise failed (when the printer is simply being shared).

In at least some embodiments, the printer tunnels 210A-210N and/or the printer tunnel manager 236 operate to adjust printer driver timeout settings, to simulate standard printer delays, to present status messages appropriate for the remaining delay or other related functions. If a local printer driver is able to spool print requests, the corresponding printer tunnel and printer tunnel manager 236 are able to leverage the spooling capacity to delay a print request without creating an exception condition. If the printer 250 does issue an exception notification (e.g., low toner), the printer tunnel manager 236 can send the exception notification to the client with current control of the printer. If there is no controlling client when the exception notification is asserted by the printer 250, the printer tunnel manager 236 stores or discards the exception notification until a client sends a print request and receives control of the printer 250. If the exception notification is discarded, the printer 250 would have to assert the exception again. In some embodiments, the printer tunnel manager 236 sends exception notifications to all of the clients 202A-202N. Alternatively, the printer tunnel manager 236 sends exception notifications to selected clients (e.g., an administrator of the server 230 selects the appropriate clients).

Similarly, if a printer service notification (e.g., out-of-paper) is asserted during a print request, the printer tunnel manager 236 is able to send the printer service notification to the client which controls the printer 250. Additionally or alternatively, the printer tunnel manager 236 sends the printer service notification to at least one of the non-controlling clients.

In at least some embodiments, the server 230 comprises a home server that is physically close to the clients 202A-202N (e.g., within the same house or building). Alternatively, the server 230 comprises a remote server that is distant from the clients 202A-202N. In either case, the server 230 enables multiple clients to print to the printer 250 based on the local printer drivers 208A-208N rather than a centralized printer driver. As an example, the server 230 may be running a Linux OS or another OS with meager printer driver support. In such case, using the printer tunnel scheme enables flexibility in designing the server 230 without compromising printer sharing. Advantageously, the printer tunnel scheme is not dependent on a Server Message Block (SMB) protocol or other printing protocols used for high-end (expensive) printers.

Figure 3:
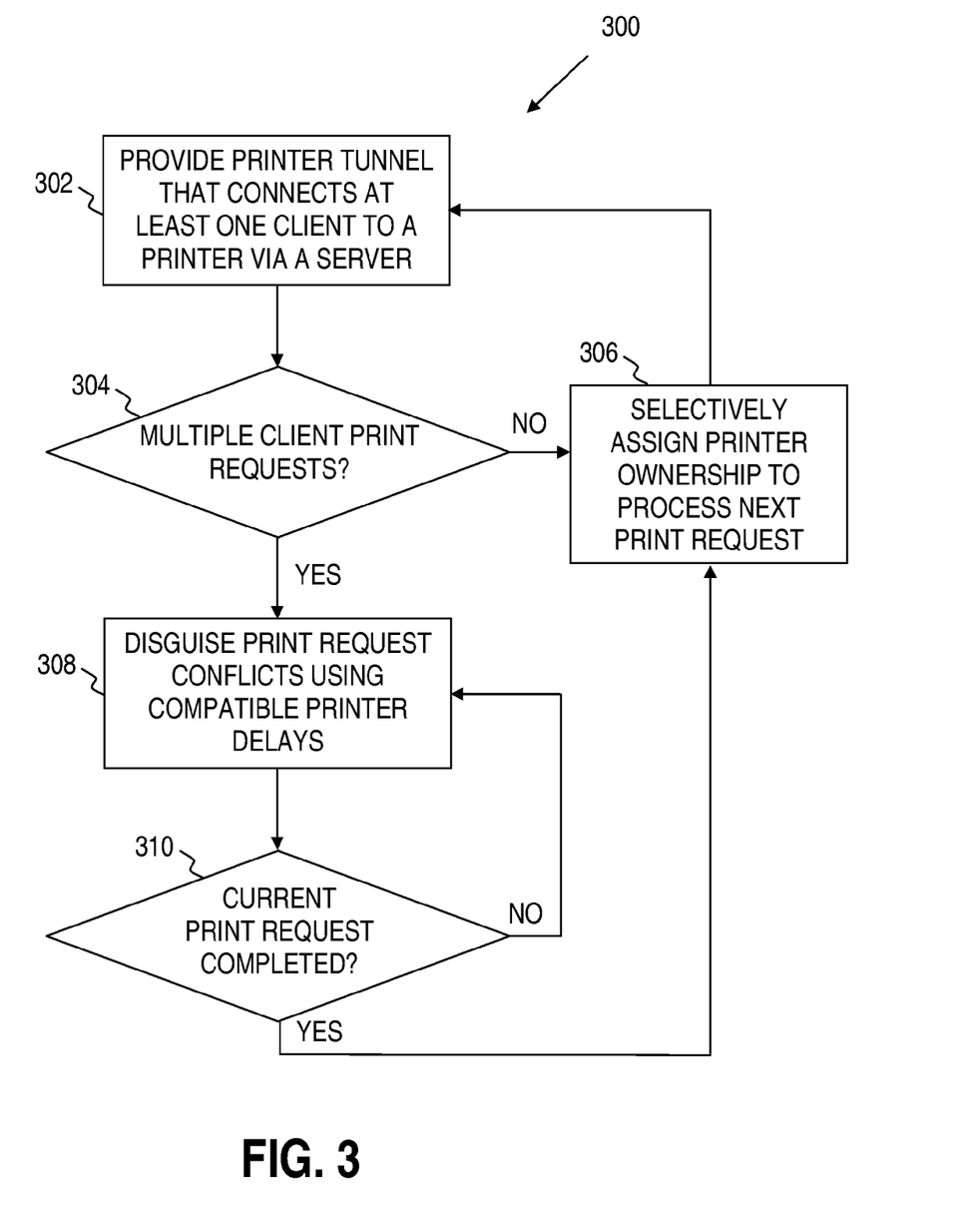
FIG. 3 illustrates a method in accordance with embodiments.

FIG. 3 illustrates a method 300 in accordance with embodiments. The method 300 comprises providing a printer tunnel that connects multiple clients to a printer via a server (block 302). As described herein, a printer tunnel enables a remote printer to be used with each client's local printer driver. In at least some embodiments, the printer tunnel emulates a virtual printer having a virtual address for each client. The virtual address is used for communications between the client and the remote printer. If multiple print requests are not received (determination block 304), printer ownership (control) is selectively assigned to enable a client to process a next print request (block 306). If multiple print requests are received (determination block 304), print request conflicts are disguised using compatible printer delays (block 308). In other words, while overlapping print requests are buffered, each waiting client receives a compatible printer delay notification rather than a "printer not available" or similar message. Block 308 is repeated until a current print request has been completed (determination block 310). Once a current print request has been completed (determination block 310), printer ownership is selectively assigned to enable a client to process a next print request (306).

The method 300 enables a client running a local printer driver to share a printer attached to a server. Printer tunnel functions running on each client and on the network server enable each client to selectively control the printer without perceiving print request conflicts. The method for selecting a printer when there are multiple print requests corresponds to a FIFO method, a prioritization method (e.g., priority is given to the current printer "holder") or some other method. Any print request conflicts are disguised as print delays compatible with client printer drivers. The method 300 could also comprise processes for selectively distributing printer service requests and exception conditions from a printer to at least one of the clients sharing the printer.

Figure 4:
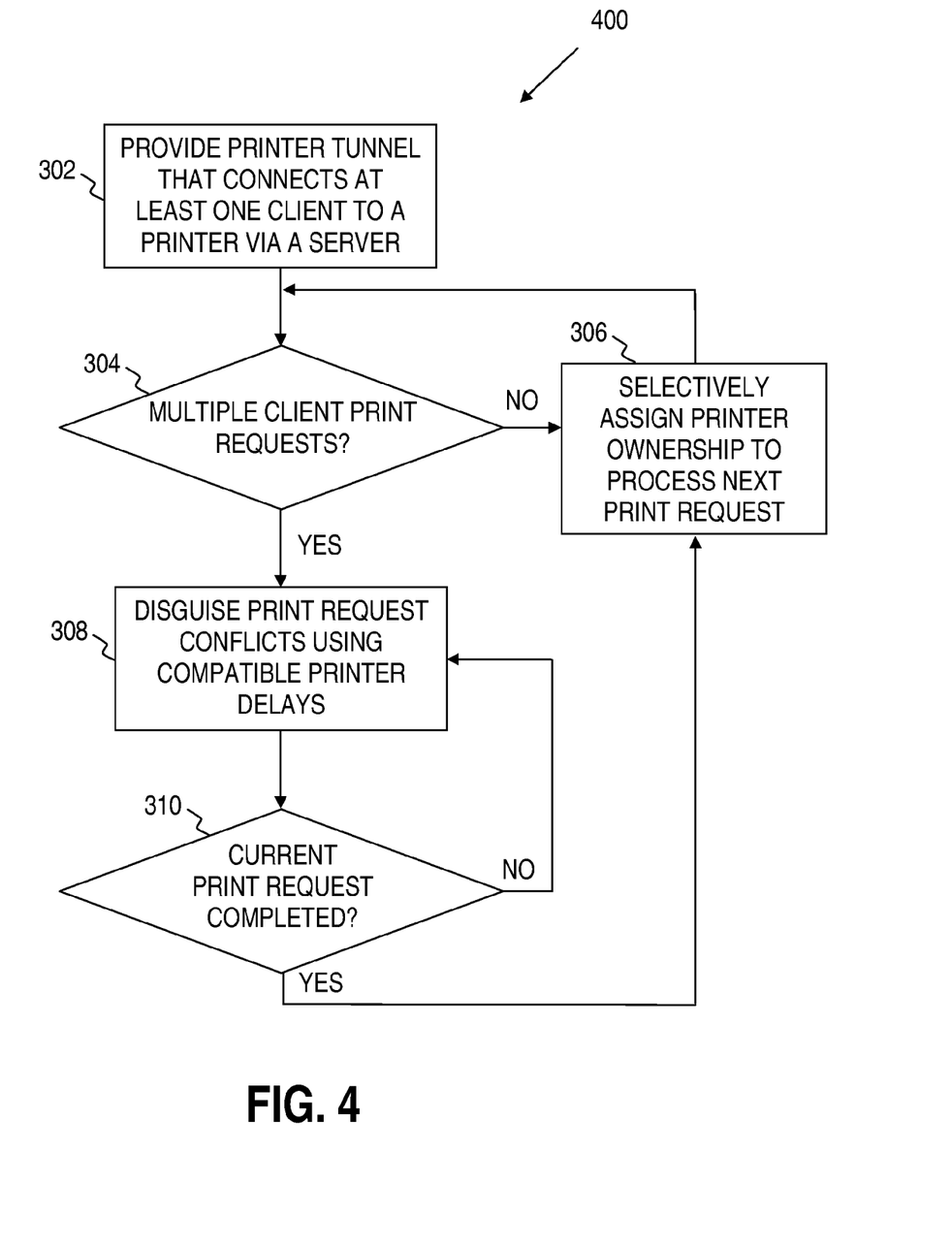
FIG. 4 illustrates another method in accordance with embodiments.

FIG. 4 illustrates a method 400 in accordance with embodiments. As shown, the method 400 comprises the same blocks as the method 300 of FIG. 3. In FIG. 4, the output of block 306 is input to the determination block 304 rather than the block 302 as was illustrated for the method 300. In other words, the method 300 illustrates that the process of providing a printer tunnel is repeatable (i.e., new printer tunnels can formed) whereas the method 400 illustrates that a printer tunnel is maintainable.

What is claimed is:

1. A system, comprising:
   at least one client computer, wherein each client computer comprises a processor and a system memory having a local printer driver and a printer tunnel application, wherein the printer tunnel application is configured to cause print requests from the local printer driver to be forwarded to a virtual local printer address, and wherein the printer tunnel application is part of a Universal Serial Bus (USB) stack;
   a server computer coupled to the at least one client computer via a network; and
   a printer coupled to the server computer and shared by the at least one client computer, wherein the printer is perceived by each client computer to be a local printer.

2. The system of claim 1 wherein overlapping print requests from the at least one client computer are handled to maintain each client computer's perception that the printer is a local printer.

3. The system of claim 1 wherein the printer tunnel application is configured to cause the print requests from the local printer driver to be encapsulated into a network packet for transmission to the server computer.

4. The system of claim 1 wherein the server computer comprises a processor and a system memory having a printer tunnel manager, wherein the printer tunnel manager is configured to cause overlapping print requests to be buffered and cause simulation of standard print delays to the at least one client computer with buffered print requests.

5. The system of claim 4 wherein the printer tunnel manager is configured to selectively assign control of the printer to one of the at least one client computer.

6. The system of claim 4 wherein the printer tunnel manager is configured to selectively return printer service requests and exception conditions to at least one of the at least one client computer.

7. The system of claim 1 wherein the server computer is a headless server.

8. A method, comprising:
   providing, by a server computer, a printer tunnel between at least one client and a printer attached to the server computer;
   enabling, by the server computer, the at least one client to share the printer via the printer tunnel as if the printer were local to each client; and
   receiving, by the server computer, a print request directed to a virtual local printer address from a printer tunnel application that is part of a Universal Serial Bus (USB) stack of each client.

9. The method of claim 8 further comprising handling, by the server computer, overlapping print requests from the at least one client without revealing that the printer is being shared.

10. The method of claim 8 further comprising selectively transferring, by the server computer, control of the printer from one client to another client.

11. The method of claim 8 further comprising buffering, by the server computer, overlapping print requests and simulating a compatible print delay message to the at least one client whose print requests are being buffered.

12. The method of claim 11 wherein simulating the compatible print delay message comprises simulating a printer warm-up delay.

13. The method of claim 8 further comprising establishing, by the server computer, the virtual local printer address for each client, wherein the printer tunnel relies on the virtual local printer address for communications between the at least one client and the printer.

14. The method of claim 8 further comprising selectively forwarding, by the server computer, printer service requests and exception conditions to the at least one client via the printer tunnel.

15. The method of claim 8 further comprising selectively adjusting, by the server computer, printer timeout settings for at least one client printer driver.

16. A non-transitory computer-readable medium that stores instructions that upon execution cause a client computer to:
   establish, using a printer tunnel application that is part of a Universal Serial Bus (USB) stack in the client computer, a virtual local printer address; and
   transmit, by the printer tunnel application, print requests directed to the virtual local printer address to a printer attached to a server.

17. The non-transitory computer-readable medium of claim 16 wherein the instructions when executed further cause control of the printer to be assigned by the server to the client computer.

18. The non-transitory computer-readable medium of claim 16 wherein the instructions when executed further cause the client computer to communicate with the printer as if the printer were local to the client computer.

* * * * *